United States Patent [19]

Wachs et al.

[11] 3,813,497

[45] May 28, 1974

[54] MICROWAVE MULTIPLEX SWITCH

[75] Inventors: Marvin Richard Wachs, Rockville; Arnold Berman, Kensington, both of Md.

[73] Assignee: Communications Satellite Corporation, Washinton, D.C.

[22] Filed: Apr. 12, 1972

[21] Appl. No.: 243,330

[52] U.S. Cl. .................... 179/18 GF, 317/235 AD

[51] Int. Cl. .................... H04j 3/00

[58] Field of Search .................... 179/18 GF, 15 AQ; 317/235 AD

[56] References Cited

UNITED STATES PATENTS

| | | | |
|---|---|---|---|
| 3,008,089 | 11/1961 | Uhlir | 317/235 AD |
| 3,132,210 | 5/1964 | Adelaar | 179/18 GF |
| 3,185,898 | 5/1965 | Ehlschlagger | 179/18 GF |
| 3,346,825 | 10/1967 | Scott | 317/235 AD |
| 3,475,700 | 10/1969 | Ertel | 317/235 AD |

*Primary Examiner*—William C. Cooper
*Assistant Examiner*—David L. Stewart
*Attorney, Agent, or Firm*—Sughrue, Rothwell, Mion, Zinn and Macpeak

[57] ABSTRACT

N x N microwave multiplex switch matrix for use on multi-transponder satellites. Incoming signals on any of the N input conductors can be selectively channeled to any of the N output conductors through single pole-single throw switching elements. Cascaded directional couplets are utilized in an equal power splitter arrangement to transfer equal portions of the incoming signals to each of the output conductors.

9 Claims, 7 Drawing Figures

MICROWAVE MULTIPLEX SWITCH

BACKGROUND OF THE INVENTION

In communication satellite technology, there exists what is known as the multitransponder satellite. As the name implies, such satellites use a plurality of transponders coupled to a plurality of antennas for relaying signals from various locations on the earth to various other locations. Generally spot beam antennas, meaning that their beam apertures are localized, rather than global coverage antennas, are used. For example, in a relay satellite serving designated areas A, B, C and D, a pair of A spot beams may serve as receiving and transmitting antennas for area A, while a pair of B spot beams serve as receiving and transmitting antennas for area B. Likewise, areas C and D have antenna pairs associate therewith. The capacity of a satellite system using spot beam antennas is increased through a reuse of the frequency spectrum. That is, the same frequency may be used by stations in each area A, B, C, and D to transmit and receive signals via the respective spot beam antennas which provide the required isolation amongst the stations.

A multitransponder satellite must have the capability of relaying signals emanating from any of the designated areas to any of the other areas as well as back to the originating area. Thus, for example, signals emanating from a station in area B and intended for other stations in area A, C, and D must be transferable through the satellite to the transmitting spot beam antennas associated with the areas A, C, and D serviced by the satellite. It is therefore necessary to provide on board the satellite an interconnecting system which can function to provide selectively closed path links from each of the receiving antennas to each of the transmitting antennas. Such an interconnecting system must be capable of providing a large number of such path links, as well as being relatively compact and reliable.

SUMMARY OF THE INVENTION

It is an object of this invention to provide a reliable, compact and lightweight interconnecting system for use on a multitransponder satellite to provide selectively closed path links from each of the receiving antennas to all of the transmitting antennas.

It is a further object of the invention to provide the interconnecting system via an N input by N output multiplex switching matrix, each of the N input conductors being selectively coupled to any one or more of the N output conductors through single pole-single throw (SPST) switching elements.

The above objects are accomplished in accordance with the teachings of this invention by constructing a multiplane N × N switching matrix having N input conductors positioned in a first plane, coupled to the receiving antennas through suitable receivers and N output conductors in a second plane, parallel to the first plane, and coupled through suitable transmitters to the transmitting antennas, the output conductors being positioned substantially normal to the input conductors. The SPST elements are preferably formed from PIN diodes. Further, in addition to the SPST switching elements, the path links may include cascaded directional couplers functioning as an equal power splitter.

DETAILED DESCRIPTION OF THE PREFERRED EMBODIMENT

Figure 1:
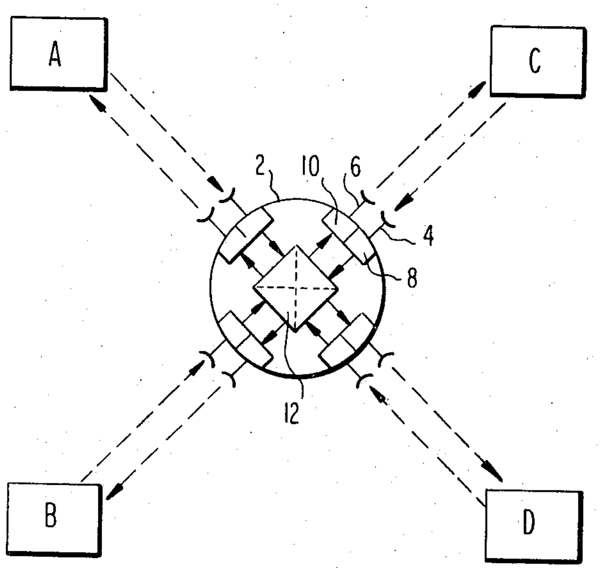
FIG. 1 is a representation of a multitransponder satellite servicing four defined areas.

FIG. 1 illustrates a multitransponder satellite 2 serving areas A, B, C and D. Associated with each area is at least one pair of satellite antennas, a receiving antenna 4 and a transmitting antenna 6. It is to be understood that although only one pair of antennas is illustrated with respect to each area served by the satellite, additional pairs of antennas responsive to other carrier frequencies or planes of polarization may be associated therewith. In the description that follows, it will be assumed that all transmissions to the satellite regardless of their area of origination have a common carrier frequency, while all transmissions from the satellite are on another common carrier frequency.

Associated with each receiving antenna 4 is a receiver 8, while for each transmitting antenna 6 there is a transmitter 10. In order to provide path links from each of the receiving antennas to all of the transmitting antennas, there is provided an interconnecting system 12 in the form of a microwave multiplex switch matrix. It is the switch matrix for use on the multitransponder satellite to which this invention pertains.

Figure 2:
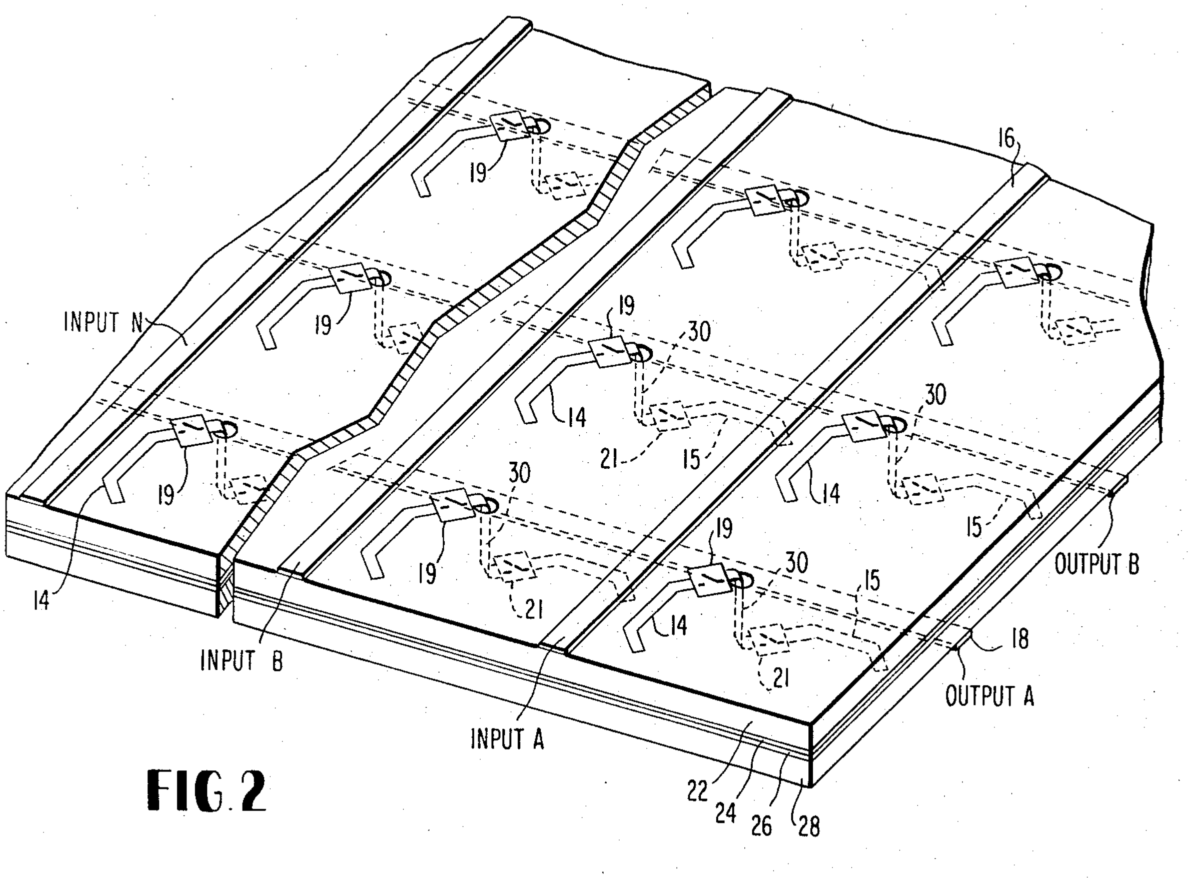
FIG. 2 is an illustration of one embodiment of the invention using microstrip conductors.

FIG. 2 illustrates one embodiment of the multiplex switch matrix of the invention. In this embodiment, microstrip conductors are utilized. However, other types of conductors such as strip line conductors may also be used. Further, FIG. 2 illustrates the use of directional couplers 14 and 15 at each crossover point to transfer incoming signals on an input conductor 16 to an output conductor 18 through a switching mechanism comprising SPST switching elements 19 and 21 and a crossover conductor 30.

In the microstrip configuration, input conductors 16 are positioned parallel to each other on a suitable dielectric substrate 22. On the opposite side of dielectric substrate 22 is a ground plane 24. A ground plane 26 of a microstrip transmission line which includes output conductors 18 abuts ground plane 24. The output conductors 18 are separated from the ground plane 26 by a suitable dielectric susbstrate 28 and are positioned normal to the input conductors. Each of the input conductors is connected through conventional connectors to a receiver associated with a receiving antenna. Thus, input conductor 16 denoted input A would be connected to the receiver associated with the receiving antenna assigned to area A. Similarly, the input conductor 16 denoted input B would be connected to the receiver associated with the receiving antenna assigned to area B. In a like manner, the output conductors are connected to the transmitters associated with the various transmitting antennas. Thus, output conductor 18 labeled output A would be connected to the transmitter associated with the transmitting antenna assigned to area A.

Signals on an input conductor 16 are selectively transferred to any one of the N output conductors 18 by a selectively closed path link which in the preferred embodiment includes input and output conductor directional couplers and a switching mechanism comprised of SPST switch elements 19, 21 and a crossover conductor 30. In the configuration of FIG. 2, a first SPST switching element 19 is positioned coplanar with the input conductors while the second switching element 21 is coplanar with the output conductors. It should be understood, however, that the teachings of this invention do not require the use of two switching elements and that a single switching element may be utilized. However, as will be explained below, the utilization of two elements provide operating advantages over the use of the single switching element. Further, directional couplers are used as an equal power splitter to tap signals off the input conductor and supply them to the output conductors. The use of the directional couplers will be explained more fully below. However, path links between input and output conductors can be formed without directional couplers by directly tapping off signals from the input lines. With the direct tap-off procedure, the spacing between switching mechanisms associated with a crossover input conductor must be carefully controlled along with the impedance of these mechanisms and the conductors which link the switching mechanisms to the input and output conductors. The spacing and impedance control requirements are necessitated by the requirement off equal power tap-of at each crossover point and high quality impedance match.

Figures 3, 4, 5, 6:
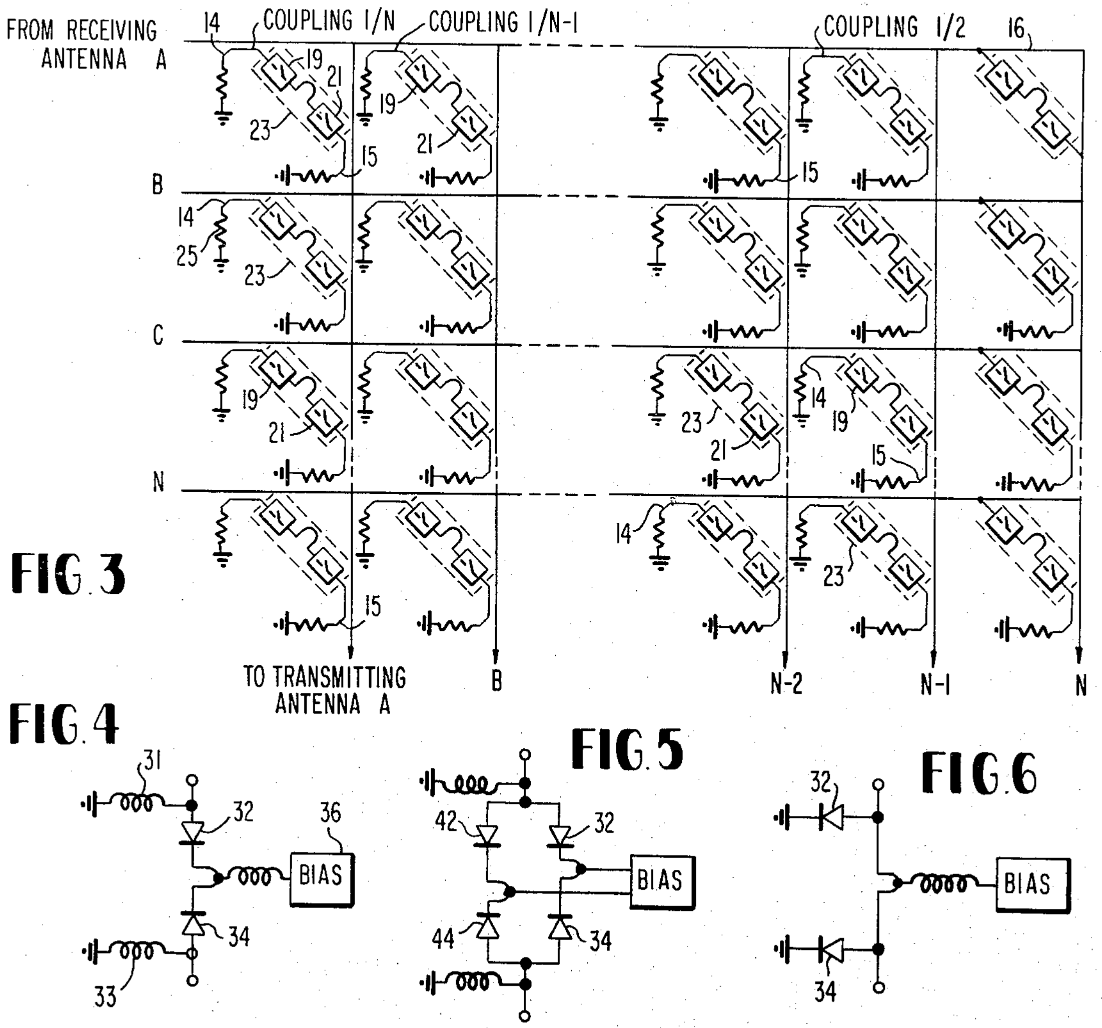
FIG. 3 is a schematic drawing of the microwave multiplex switching matrix of the present invention.
FIG. 4 is a drawing of a first embodiment of the switching mechanism forming part of a path link.
FIG. 5 illustrates a second embodiment of the switching mechanism.
FIG. 6 shows a third embodiment of the switching mechanism.

FIG. 3 is a schematic representation of the directional coupler embodiment of the N × N multiplex switch matrix of the present invention. Like elements in FIGS. 2 and 3 carry common designations. For example, line A in FIG. 3 corresponds to input conductor 16 designated input A in FIG. 2. Similarly, the directional coupler 14, located coplanar with the input conductors in FIG. 2 is labeled 14 in FIG. 3. Each of the directional couplers are properly terminated in a conventional manner to provide proper matching at all coupler ports. The particular termination depends upon the line impedance. Thus, for a 10 ohm input conductor, directional coupler 14 would be terminated in a 10 ohm impedance. In this manner, the switch matrix has a flat frequency response over a wide frequency range.

As previously indicated, the directional couplers 14 are constructed such that they form an equal power splitter. That is, assuming 10 milliwatts of input power on an input line 16 and ten output lines 18, 1 milliwatt of power should be tapped off at each crossover point 1A, IB, IC,... IN where the first letter in each letter pair designates a row or input conductor while the second letter designates a column or output conductor. Thus, the crossover points associated with input conductor A are AA, AB, AC,. . . AN. To accomplish this, the directional couplers 14 associated with each input conductor such as input conductor A are configured so that one-tenth of the input signal power (one milliwatt in the given example) is tapped off at crossover point AA. Thus, the directional coupler 14 associated with the crossover point AB sees only 9 milliwatts of power. The AB directional coupler 14 is constructed to tap off one-ninth of the received power to provide 1 milliwatt of power to output conductor B. Generally, for N output lines, successive directional couplers looking in a direction away from the signal input terminal of an input conductor 16 are configured to produce coupling coefficients of 1/N, 1/N−1, 1/N−2. . . and 1/2. At the crossover point AN no directional coupler is required. Directional couplers which can be so configured are described in the publication by Matthaei, Young and Jones, Microwave Filters, Impedance Matching Networks and Coupler Structures, McGraw Hill, 1964.

Preferably, the switching elements 19 and 21 of the switching mechanism 23 are PIN diodes. The use of two such switching elements is preferred over the use of a single element for greater isolation is achieved with the two switching elements configuration, the spacing between these elements being set at λ/4 (or an odd multiple of λ/4) where λ designates the wavelength of the input signal. Three configurations for the switching mechanism 23, each using PIN diodes are illustrated in FIGS. 4, 5 and 6, respectively. Like elements in FIGS. 2–6 are commonly designated.

With reference to FIG. 4, a switching mechanism can be comprised of series connected PIN diodes 32 and 34 as the switching elements 19 and 21 respectively. These diodes are selectively biased into conduction by bias source 36 connected to their cathodes. The two diodes would be spaced apart by a distance equal to λ/4. Through the transforming action of the transmission line when the diodes are so spaced, any stray capacitance or inductance associated with the diode package and mounting structure will be effectively cancelled. In order to optimize the switching speed of the PIN diodes they are connected in parallel with respect to the bias source 36. At this point it is noted that with respect to alternating current (AC) signals the PIN diodes appear as bidirectional elements. It should also be noted however, that although the two diode configuration is disclosed with respect to the preferred embodiments of the invention, the invention should be construed as including the single diode configuration as well (or numbers of diodes greater than 2).

In a series diode connection scheme, a closed path link is provided at a selected crossover point by biasing the diodes at that point into forward conduction. The diodes associated with the remaining crossover points common to the input conductor carrying the input signals remain in their back biased state.

FIG. 5 shows a modification of the switching mechanism 23 illustrated in FIG. 4. In this configuration, added redundancy is built into the system by including series connected diodes 42 and 44 in parallel with series connected diodes 32 and 34. Should a diode 32 or 34 fail to operate, diodes 42 and 44 complete the path link between an input conductor and a selected output conductor.

FIG. 6 illustrates another configuration for the switching mechanism 23. In this configuration, switching element 19 is in the form of a PIN diode 32 connected in parallel with a second PIN diode 34 functioning as switching element 21. The cathodes of these diodes are common and grounded while the bias source 36 is coupled to their anodes. In operation, a closed path link is formed at any of the crossover points by rendering conductive all of the diodes associated with the particular input conductor carrying the input signals, except the diodes at the desired crossover point. For example, let it be assumed that signals on input conductor A are to be transferred to output conductor B. Thus, the diodes associated with crossover points AA, AC. . . AN are rendered conductive while the diodes at crossover point AB remain non-conductive. A disadvantage of this configuration over the series configuration is that greater power must be utilized in order to effect the closed path link since in this configuration 2N - 2 diodes must be rendered conductive while in the series configuration only two diodes are rendered conductive.

Figure 7:
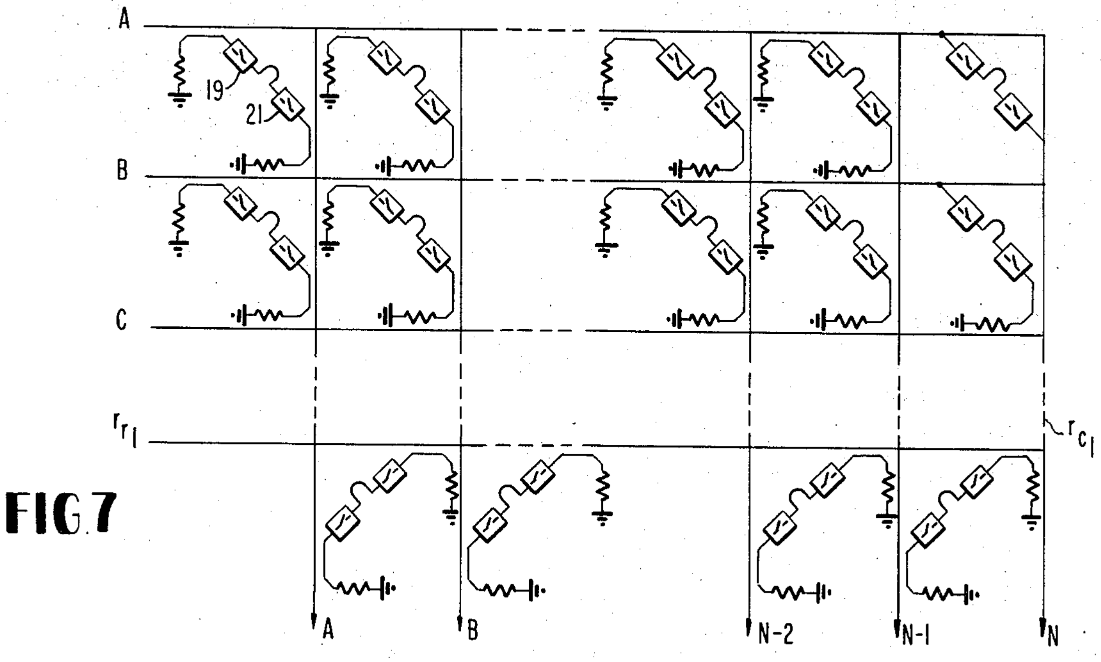
FIG. 7 illustrates a modification of the basic switch matrix whereby redundancy is built into the switch matrix.

Further redundancy can be added to the multiplex switch matrix by incorporating into the matrix unassigned rows and columns as illustrated in FIG. 7. If the switching elements at crossover point AB, for example, fails, an alternate path may be formed to link a signal from input conductor A to output conductor B via redundant row conductor $r_{rl}$ and redundant column conductor $r_{cl}$. The switching elements associated with crossover A$r_{cl}$ and $r_{rl}$ B would be activated to provide a closed path link between input conductor A and output conductor B through column conductor $r_{cl}$ and row conductor $r_{rl}$.

When the switch of this invention is incorporated into a multitransponder satellite, the selective activation of the bias sources to provide the required closed path link may be synchronized with the transmission of signals from the ground stations. For example, signal transmissions from serviced areas may be destination coded. That is, the signals are arranged in time slots in accordance with their destination. During a first time slot area A may transmit signals destined only for area B for example, while during the next time slot signals from area A would all be destined to area C. If areas A, B, C and D are to communicate simultaneously, then during the first time slot all transmissions from area B may be directed to area A, while transmissions from area C may be directed to area D and transmissions from area D to area C.

Although not a part of this invention, the closing of the switching elements may be simply controlled by a clock and time decoder (not shown) on board the satellite, the decoder being coupled between the clock and the bias sources 36. The timing of the transmissions from the ground stations would be preassigned to correspond to the clocking sequence generated by the time decoder. As an example, one output from the time decoder would be coupled to the bias sources 36 of crossover points AB, BA, CD and DC. Since the activation time of these bias sources is known in advance, transmissions from A, B, C and D directed to areas B, A, D and C would be made to begin in time coincidence with the closing of the path links at crossover points AB, BA, CD and DC.

Although the above description discloses the preferred embodiment of the present invention, it is obvious that artisans in the art could make various modifications within the scope of the present invention and accordingly, the aforementioned should be interpreted in accordance with the following claims.

What is claimed is:

1. A microwave multiplex switching matrix comprising;

N parallel input conductors positioned in a first plane;

N parallel output conductors positioned in a second plane and normal to said input conductors;

N equal power splitter means associated, respectively, with said N input conductors, each said equal power splitter mean having N ports for receiving 1/N of the signal power applied to said input conductor;

N equal power combiner means associated, respectively, with said N output conductors, each said equal combiner means having N input ports; and a plurality of selectively closeable microwave switching means, each said switching means connected, respectively, between one port of one of said equal power splitter means and one port of one of said equal power combiner means, the total plurality of switching means being arranged so that the N ports of any single power splitter are connected, respectively, to N ports of all N equal power combiner means.

2. A switching matrix as claimed in claim 1 wherein each of said equal power splitters comprises N directional couplers arranged in sequence along said conductor, each of said couplers having an impedance matching termination and being connected to one of said microwave switching means.

3. A switching matrix as claimed in claim 2 wherein said directional couplers are arranged with respect to said input conductor so that the one nearest the input end of said conductor picks off 1/N of the power on the conductor where said directional coupler is located, the next adjacent directional coupler picks off 1/N-1 of the power appearing on the conductor where said directional coupler is located, and each succeeding directional coupler picks off 1/N-x of the power, where x is a number representing the number of directional couplers from the one nearest the said input end.

4. The switching matrix of claim 3, wherein said input conductors are positioned parallel with respect to each other, said output conductors are positioned parallel with respect to each other and said output conductors are positioned normal to said input conductors.

5. The switching matrix of claim 4, wherein said switching means are single pole single throw switches.

6. The switching matrix of claim 5, wherein said single pole single throw switches are PIN diodes.

7. The switching matrix of claim 5, wherein each said switching means includes two PIN diodes connected in series opposition.

8. The switching matrix of claim 5, wherein each said switching means includes two parallel connected PIN diodes.

9. The switching matrix of claim 5, wherein at least one of said input conductors and at least one of said output conductors form redundant conductors, wherein the switching means associated with said redundant conductors provides selectively closeable paths from any other of said input conductors to any other of said output conductors via said redundant conductors.

* * * * *

UNITED STATES PATENT OFFICE

CERTIFICATE OF CORRECTION

Patent No. 3,813,497 Dated May 28, 1974

Inventor(s) Marvin Richard Wachs et al

It is certified that error appears in the above-identified patent and that said Letters Patent are hereby corrected as shown below:

In The Specification:

Column 3, line 36 delete "off" and insert -- of --
line 36 delete "tap-of" and insert -- tap-off --

Signed and sealed this 8th day of October 1974.

(SEAL)
Attest:

McCOY M. GIBSON JR.
Attesting Officer

C. MARSHALL DANN
Commissioner of Patents